Dec. 28, 1948. L. H. FLORA 2,457,360
FASTENING CONSTRUCTION
Filed July 24, 1946
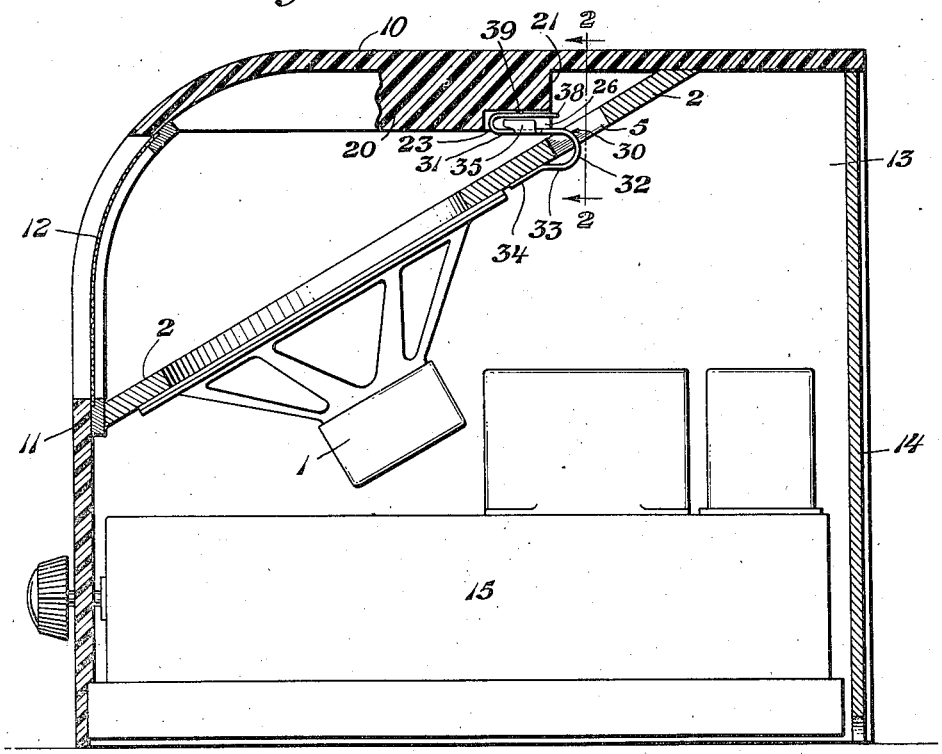
Inventor
Laurence H. Flora
By H. L. Lombard
Attorney Patented Dec. 28, 1948

2,457,360

UNITED STATES PATENT OFFICE 2,457,360

FASTENING CONSTRUCTION

Laurence H. Flora, Cleveland, Ohio, assignor to Tinnerman Products, Inc., Cleveland, Ohio, a corporation of Ohio Application July 24, 1946, Serial No. 686,042

7 Claims. (Cl. 24—259)

1

This invention relates in general to clip fastened installations, and deals, more particularly with an improved fastening arrangement for securing parts in angular relationship by a simple, easily and quickly applied clip fastener.

A primary object of the invention is to provide a fastening construction for securing an object or part to a supporting part by means of a clip having a resilient stud portion receivable in a recess or slot in one of said parts together with a resilient spring arm engaging the other part and adapted to yield to permit the assembly of said parts in a desired angular relationship, and otherwise firmly and rigidly securing said parts in assembled position.

A further object of the invention is to provide a clip for such a fastening installation in which the stud of the clip is adapted to be applied to a fixed, rigid connection in a slot in the recessed part in one direction and retained therein against loosening or displacement in the reverse direction.

Another object of the invention is to provide a clip of the kind described in the form of a simple, one-piece sheet metal device which is cheap and inexpensive to manufacture and lends itself to economical quantity production in that it may be produced at relatively low cost from ordinary sheet metal strip stock with little loss or waste of material.

Further objects and advantages, and other new and useful features in the construction, arrangement and general combination of parts of the invention will be readily apparent to those skilled in the art as the following description proceeds with reference to the accompanying drawings, for purposes of illustration but not of limitation, in which like reference characters designate like parts throughout the same, and in which:

Fig. 1 is a vertical sectional view illustrating a fastening installation in accordance with the invention for securing the parts of an assembly in angular relationship;

Fig. 2 is an enlarged sectional view taken on line 2—2 of Fig. 1, looking in the direction of the arrows, the area bordering the fastener receiving recess in one of said parts being also shown in section to illustrate the specific formation thereof;

Fig. 3 is a top plan view of the fastener per se shown in Figs. 1 and 2; and,

Fig. 4 is a side view of Fig. 3 showing the fastener in edge elevation.

Referring now, more particularly to the drawings, Fig. 1 illustrates a typical application of the invention as incorporated in a radio cabinet construction for mounting the speaker unit therein. In the present example, the speaker unit 1 of the radio set is attached to an inclined baffle board 2 which is mounted in angular relationship to the top 10 and front 11 of the radio cabinet to position the speaker unit in proximity to a screened grille 12 located in the upper portion of the cabinet front. The radio cabinet otherwise comprises sides 13 and a removable back panel 14, all housing the operating mechanism 15 in operative relation to the speaker unit 1.

The radio cabinet may be made of any suitable plastic, wood or metal material, and when made of plastic, it is a simple matter in the molding operation to provide one or more rigid bosses 20 integral with the top of the cabinet and extending from the front toward the back thereof. The boss 20 is of such length as to have its end face 21 in close or abutting relation to the baffle board 2 in mounted position. The boss 20 includes a longitudinal channel shaped recess 23, having a top wall 24, Fig. 2, and side walls including inwardly inclined portions defining diverging shoulders or ribs 26 at the open end of the recess, Fig. 2.

The baffle board 2 has an opening 5 in suitable alignment with and communicating with the recess 23 in the boss in the mounted position of the baffle board, and, in this relation, the ends of the baffle board preferably are so designed as to bear firmly on the adjacent inner surfaces of the front and top of the cabinet in order to rigidify the assembly, as shown in Fig. 1.

A preferred form of clip for securing the parts of the assembly just described is designated generally 30, and as best seen in Figs. 3 and 4, the clip is a simple inexpensive form of fastener which may be manufactured at low cost from ordinary sheet metal strip stock with little loss or waste of material. The clip may be made from any suitable sheet metal, preferably of a spring metal nature such as spring steel or cold rolled steel having spring like characteristics.

The clip 30 is formed from a sheet metal body or strip bent intermediate its ends to define a resilient stud member 31 and a relatively large resilient U-shaped loop 32 providing a return bent spring arm 33 having a generally flat end portion 34 extending in spaced relation to said stud 31. The stud 31 defines a resilient shank receivable in the recess 23 in the connecting boss 20, and, in this relation, comprises elements conforming generally to the outline of said recess for firmly and rigidly seating the stud therein.

Accordingly, the stud 31 includes upwardly bent side portions defining outwardly flaring side or wing elements 35 having an inclination corresponding to that of the inclined shoulders or ribs 26 in said recess. The forward ends of said wings 35 are rounded or inturned as at 36 to facilitate the entrance of the wings into the recess. Preferably, said wings 35 are provided from only a portion of the length of the fastener body leaving base portions 37 in the plane of the body. Thus, as best seen in Fig. 2, the angular relation between each wing 35 and the adjacent base portion 37 conforms generally to the angular formation of the shoulders or ribs 26 in the recess 23.

A spring finger 38 provided preferably by a return bent portion on the fastener body, is designed to provide a wedging action in engagement with the top wall 24 of the recess to retain the stud 31 firmly and rigidly seated in said recess in applied position. To anchor the stud in this position against shifting or reverse movement toward disassembly from the recess, the spring finger 38 is provided with tapered prongs 39, barbs or similar lugs which permit sliding of the stud 31 into the recess 23 to applied position where they bite into the plastic material of the adjacent top wall 24 of the recess and thereby lock the stud 31 in such applied position.

With the various parts provided in the manner aforesaid, it will be understood that the mounting of the baffle board 2 in the cabinet is easily and quickly effected by the application of one or more clips to a similar number of recessed bosses 20 integrally formed in the cabinet in spaced relation, the number of bosses and associated clips depending on the size of the cabinet and baffle board, and the strength desired in the mounting. In a typical attachment of a clip as shown in Fig. 1, the baffle board 2 is assembled in the cabinet to a position in which the opening or slot 5 therein is in line with the recess 23 in the boss 20. The resilient stud member 31 comprising the wings 35 and spring finger 38 is then easily passed through the opening 5 into the recess 23 with the spring arm 33 engaging the adjacent outer surface of the baffle board 2.

As the resilient stud member 31 of the clip is advanced axially in the recess 23 the flared wings 35 resiliently engage the correspondingly inclined shoulders or ribs 26 in the recess. The spring finger 38 engages the top wall 24 of the recess and is gradually compressed from its generally V-shaped relation, Fig. 4, to a substantially U-shaped relation as seen in Fig. 1. After the wings 35 have entered the recess in engagement with the inclined faces of the shoulders 26, the base portions 37 of the clip engage the outer flat faces of said shoulders. In fully applied position the resilient stud 31 of the clip is firmly and rigidly secured in the recess 23 against lateral shifting or displacement by virtue of the angularly related wings and base portions 35, 37, respectively, snugly engaging the angularly disposed faces of the ribs or shoulders 26. The rigidity of the connection of the resilient stud 31 in the recess 23 is enhanced by the spring finger 38 in engagement with the top wall 24 of the recess, and said stud otherwise is locked in fully applied position in the recess by the prongs 39 which bite into the adjacent top wall 24 of the recess to prevent any reverse axial movement or displacement of the stud toward disassembly from the recess.

As the resilient shank 31 of the clip is applied to the recess 23, the spring arm 33 in engagement with the adjacent outer face of the baffle board 2 is adapted to flex by reason of the relatively large resilient loop 32, and otherwise yield as necessary to permit the flat end portion 34 of the spring arm to engage the baffle board firmly and rigidly in the most effective manner. The action is such as the clip is applied, the loop 32 permits the spring arm 33 to flex and automatically adjust itself to the angular relationship required for the flat end portion 34 of the spring arm to have full surface engagement with the baffle board and thereby exert the utmost force thereon to mount the baffle board as firmly and rigidly as possible.

While the invention has been described in detail with a specific example such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener comprising a piece of sheet metal bent to provide a fastener body intermediate an arm portion and a spring finger extending in spaced relation to said intermediate fastener body, and side elements on said intermediate fastener body extending toward said spring finger and cooperating therewith to provide a resilient stud.

2. A fastener comprising a piece of sheet metal bent to provide a fastener body intermediate an arm portion and a spring finger extending in spaced relation to said intermediate fastener body, said intermediate fastener body including base elements projecting laterally thereof and side elements extending toward said spring finger and cooperating therewith to provide a resilient stud.

3. A fastener comprising a piece of sheet metal providing a fastener body intermediate an arm portion on one end and a return bent portion providing a reversely extending spring finger in spaced relation to said fastener body, side elements on said intermediate fastener body extending toward said spring finger and cooperating therewith to provide a resilient stud, and prong means on said spring finger for anchoring the stud in a work opening.

4. A fastening construction comprising a part provided with a recess having spaced shoulders, a resilient stud member received in said recess comprising a sheet metal body having side elements engaging said spaced shoulders and preventing transverse movement of said stud member in the recess, a spring finger spaced from said body and engaging a wall of said recess to maintain said side elements in resilient engagement with said shoulders and to prevent movement of said stud member in a direction normal to said body, and a spring arm member formed from said body at the end opposite said spring finger and securing a cooperating part to said first named part.

5. A fastening construction comprising a part provided with a recess having spaced shoulders, a resilient stud member received in said recess comprising a sheet metal body having side elements engaging said spaced shoulders and preventing transverse movement of said stud member in the recess, base portions on said body engaging said shoulders in cooperation with said side elements, a spring finger spaced from said body and engaging a wall of said recess to prevent movement of said stud member in a direction normal to said body, and a spring arm formed from said body at the end opposite said spring finger and securing a cooperating part to said first named part.

6. A fastening construction comprising a part provided with a recess having spaced shoulders in diverging relation in said recess, a resilient stud received in said recess comprising a sheet metal body having diverging side wings engaging said diverging shoulders and preventing transverse movement of said stud in the recess, a spring finger engaging a wall of said recess and urging said wings into resilient engagement with said shoulders to prevent movement of said stud in a direction normal to said body, and a spring arm formed from said body at the end opposite said spring finger and securing a cooperating part to said first named part.

7. A fastening construction comprising a part provided with a recess having spaced shoulders in diverging relation in said recess, a resilient stud received in said recess comprising a sheet metal body having diverging side wings engaging said diverging shoulders and preventing transverse movement of said stud in the recess and a spring finger engaging a wall of said recess and urging said wings into resilient engagement with said shoulders and preventing movement of said stud in a direction normal to said body, a prong on said spring finger clutching the wall of said recess to anchor the resilient stud therein, and a spring arm member formed from said body at the end opposite said spring finger and extending through an opening in a cooperating part and engaging a surface thereof adjacent said opening.

LAURENCE H. FLORA.

REFERENCES CITED

The following references are of record in the file of this patent:

UNITED STATES PATENTS

| Number | Name | Date |
| --- | --- | --- |
| 411,045 | Miller | Sept. 17, 1889 |
| 839,654 | Seachrest | Dec. 25, 1906 |
| 1,062,355 | Pfeifer | May 20, 1913 |
| 2,137,652 | Lundberg et al. | Nov. 22, 1938 |
| 2,178,719 | Cotter | Nov. 7, 1939 |
| 2,278,691 | Cotter | Apr. 7, 1942 |